(12) United States Patent
Minami et al.

(10) Patent No.: US 12,716,501 B2
(45) Date of Patent: Aug. 25, 2026

(54) DUST SEAL RING

(71) Applicant: VALQUA, LTD., Tokyo (JP)

(72) Inventors: Mitsuru Minami, Gojo (JP); Yuuichirou Yoshimoto, Gojo (JP); Akira Ueda, Gojo (JP)

(73) Assignee: VALQUA, LTD., Tokyo (JP)

( * ) Notice: Subject to any disclaimer, the term of this patent is extended or adjusted under 35 U.S.C. 154(b) by 0 days.

(21) Appl. No.: 18/850,128

(22) PCT Filed: Mar. 28, 2023

(86) PCT No.: PCT/JP2023/012571

§ 371 (c)(1), (2) Date: Sep. 24, 2024

(87) PCT Pub. No.: WO2023/190545

PCT Pub. Date: Oct. 5, 2023

(65) Prior Publication Data

US 2025/0215979 A1 Jul. 3, 2025

(30) Foreign Application Priority Data

Mar. 31, 2022 (JP) ................................ 2022-058841

(51) Int. Cl.
*F16J 15/3284* (2016.01)

(52) U.S. Cl.
CPC ................................ *F16J 15/3284* (2013.01)

(58) Field of Classification Search
CPC ...... F16J 15/32; F16J 15/3204; F16J 15/3216; F16J 15/3232; F16J 15/3284
See application file for complete search history.

(56) References Cited

U.S. PATENT DOCUMENTS 10,760,687 B2 * 9/2020 Yamaguchi .............. F16J 15/48
2006/0145426 A1 * 7/2006 Schroeder .............. F16J 15/324 277/559
2007/0222157 A1 * 9/2007 Kondo .................. F04B 53/143 277/345
2008/0272551 A1 * 11/2008 Sanada ................ F16J 15/3216 277/361
2009/0267306 A1 10/2009 Eguchi
(Continued)

FOREIGN PATENT DOCUMENTS

JP 53-99465 U1 8/1978
JP 62-92362 U1 6/1987
(Continued)

OTHER PUBLICATIONS

Japanese Office Action dated Jun. 17, 2025, which issued in a counterpart Japanese Patent Application No. 2022-058841, including Eng. translation.

*Primary Examiner* — Gilbert Y Lee
(74) *Attorney, Agent, or Firm* — Dickinson Wright PLLC

(57) ABSTRACT

A dust seal ring includes a body portion of an approximately rectangular shape, a first lip extending, on an inner surface in a radial direction of the body portion, while inclining inwardly away from the body portion on one side in a direction of extension of a central axis, and a second lip extending, on the inner surface in the radial direction of the body portion, while inclining inwardly away from the body portion on the other side in the direction of extension of the central axis.

6 Claims, 11 Drawing Sheets

(56) References Cited

U.S. PATENT DOCUMENTS

| | | | | |
|---|---|---|---|---|
| 2014/0062031 | A1* | 3/2014 | Honzek | F16J 15/3228 277/551 |
| 2016/0348791 | A1* | 12/2016 | Wagoner | F16J 15/3216 |
| 2017/0175898 | A1* | 6/2017 | Yoshino | F16J 15/3256 |
| 2019/0203841 | A1 | 7/2019 | Minami et al. | |
| 2019/0390774 | A1* | 12/2019 | Jordan | F16J 15/3256 |
| 2020/0080642 | A1* | 3/2020 | Oyama | F16F 9/362 |
| 2020/0224563 | A1* | 7/2020 | Heller | F01L 7/045 |
| 2022/0065320 | A1 | 3/2022 | Nakaya | |
| 2025/0137491 | A1* | 5/2025 | Bresso | F16J 15/3276 |

FOREIGN PATENT DOCUMENTS

| | | | |
|---|---|---|---|
| JP | 2000320687 | A | 11/2000 |
| JP | 2001032945 | A | 2/2001 |
| JP | 2001056056 | A | 2/2001 |
| JP | 2009257378 | A | 11/2009 |
| JP | 2017207148 | A | 11/2017 |
| JP | 2020106099 | A | 7/2020 |
| JP | 2021032377 | A | 3/2021 |
| JP | 2021173336 | A | 11/2021 |
| WO | 2007066503 | A1 | 6/2007 |

* cited by examiner

C2
C1
100A
II
II
CL1
110

L1
112
111c
B1
E1
100A
114
111a
B3
111b
111
E2
L2
115
B2
113
CL
111d
W1

C2
C1
200
VI
VI
CL1
210

H
111c
700
100A
122
600m
600
121
α
700t
112
113
500
S
112
113
700t
121
122

DUST SEAL RING

RELATED APPLICATION

This application is a 371 of International Patent Application No. PCT/JP2023/012571, filed Mar. 28, 2023, which claims priority to Japanese Patent Application No. 2022-058841, filed on Mar. 31, 2022, including the specification, drawings and abstract, the entire disclosures of which are incorporated herein by reference.

TECHNICAL FIELD

The present invention relates to a structure of a dust seal ring suitable for preventing oil leakage from a hydraulic elevator jack, a hydraulic cylinder, and any other fluid transmission device, and for preventing intrusion of foreign matter from outside.

BACKGROUND ART

For example, Japanese Patent Laying-Open No. 2017-207148 (PTL 1) employs a structure of a seal ring formed of an annular member, in which the seal ring is split partially in the circumferential direction and end faces facing each other are abutted. Using such a split seal ring allows the seal ring to be replaced without disassembling a fluid transmission apparatus, leading to reductions in man-hour and cost of maintenance of the fluid transmission apparatus.

CITATION LIST

Patent Literature

PTL 1: Japanese Patent Laying-Open No. 2017-207148

SUMMARY OF INVENTION

Technical Problem

In recent years, there has been a demand for a dust seal ring having improved sealing performance at its cut portion. Therefore, the present invention has an object to provide a dust seal ring that can have further improved sealing performance.

Solution to Problem

A dust seal ring of the present disclosure includes a body seal of an annular shape split partially in a circumferential direction, and a body seal abutment surface provided to be joined on a split surface of the body seal. In a cross section of the body seal as viewed along a virtual plane including a central axis of the body seal, the body seal includes a body portion of an approximately rectangular shape, a first lip extending, on an inner surface in a radial direction of the body portion, while inclining inwardly away from the body portion on one side in a direction of extension of the central axis, and a second lip extending, on the inner surface in the radial direction of the body portion, while inclining inwardly away from the body portion on the other side in the direction of extension of the central axis.

In another embodiment, in the cross section of the body seal as viewed along the virtual plane including the central axis of the body seal, the body portion includes a first protrusion protruding, on an outer surface in the radial direction of the body portion, outwardly on the one side in the direction of extension of the central axis, and a second protrusion protruding, on the outer surface in the radial direction of the body portion, outwardly on the other side in the direction of extension of the central axis.

In another embodiment, the body portion includes a first retaining plate disposed, on a first side surface of the body portion of the approximately rectangular shape on the one side in the direction of extension of the central axis, along the annular shape of the body seal, and a second retaining plate disposed, on a second side surface of the body portion of the approximately rectangular shape on the other side in the direction of extension of the central axis, along the annular shape of the body seal. In another embodiment, a length of the first lip and a length of the second lip are provided to be smaller than a width in the radial direction of the body portion.

Advantageous Effects of Invention

The present invention can provide a dust seal ring that can have further improved sealing performance.

DESCRIPTION OF EMBODIMENTS

Figure 1:
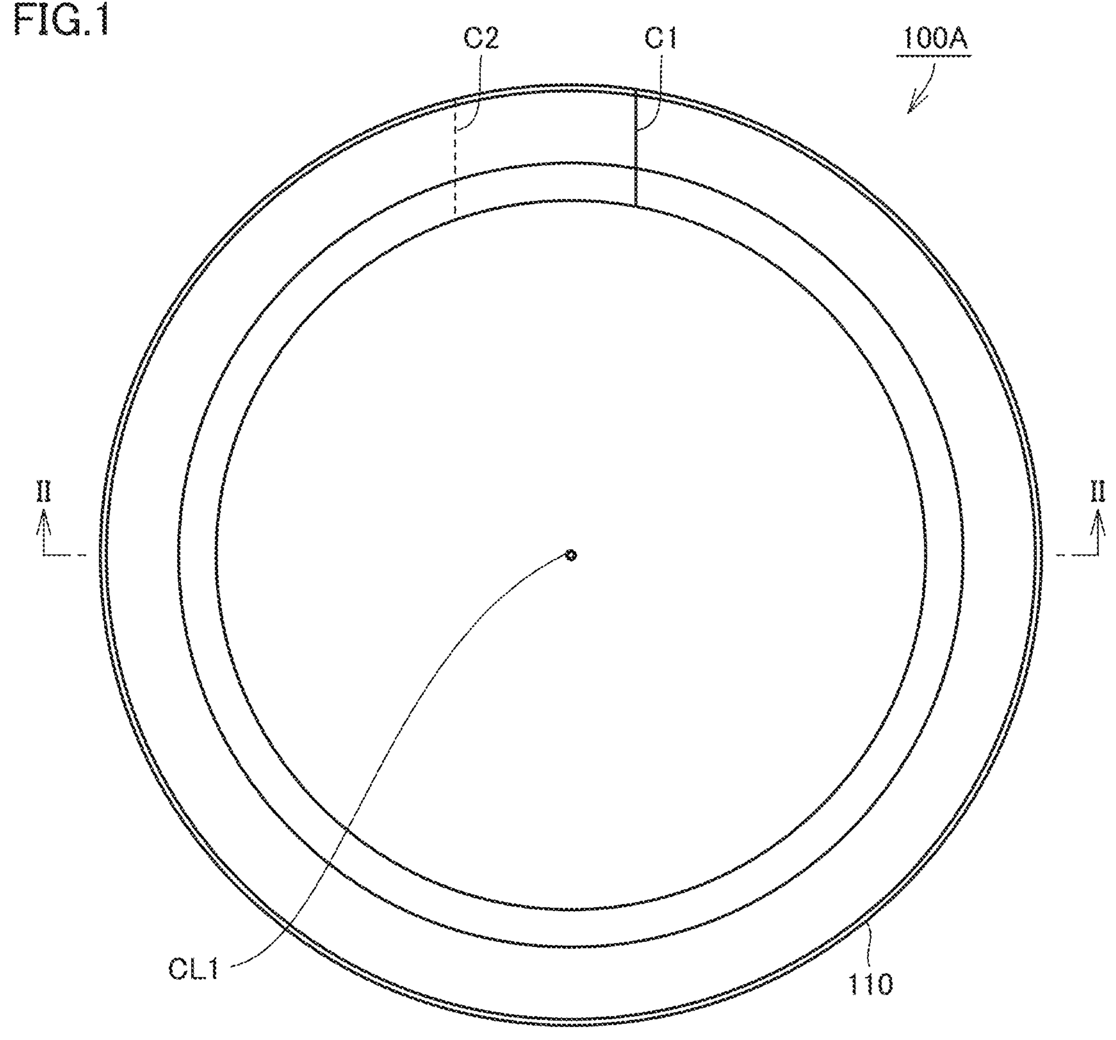
FIG. 1 is a plan view of a dust seal ring of Embodiment 1.

A dust seal ring according to the present embodiment will be described below with reference to the drawings. In the embodiments described below, when the number, quantity, or the like is mentioned, the scope of the present invention is not necessarily limited to that number, quantity, or the like, unless otherwise noted. The same or corresponding parts have the same reference characters allotted, and redundant description may not be repeated. In the following description, the terms “up” and “down” are used to indicate the positional relationship for convenience of description, but this does not exclude configurations in which the top and bottom are reversed, and configurations in which the top and bottom are positioned on the left and right.

Embodiment 1: Dust Seal Ring 100A

Figure 2:
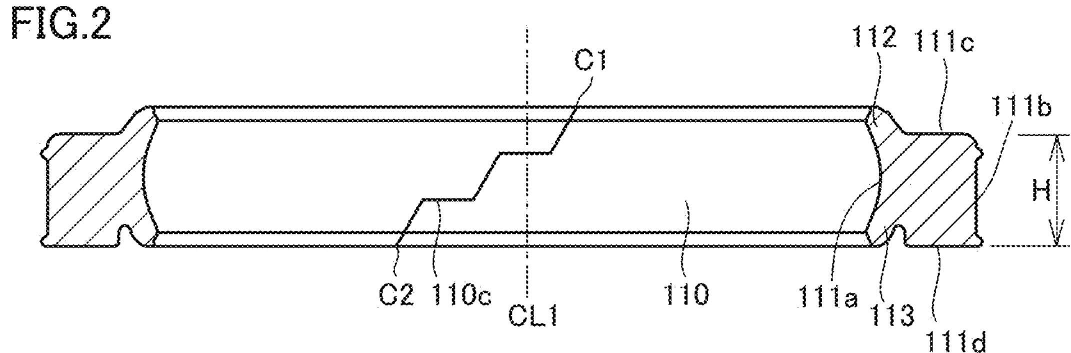
FIG. 2 is a sectional view taken along the arrow line II-II in FIG. 1.

A dust seal ring 100A of the present embodiment will be described with reference to FIGS. 1 and 2. FIG. 1 is a plan view of dust seal ring 100A, and FIG. 2 is a sectional view taken along the arrow line II-II in FIG. 1.

Dust seal ring 100A has an annular shape in plan view. By way of example, the outer diameter dimension is about ϕ 30 mm to ϕ 40 mm, the inner diameter dimension (axial dimension) is about ϕ 20 mm to ϕ 30 mm, and the height (H: see FIG. 4) of a body portion 111, which will be described below, is about 4 mm to 5 mm. For example, hydrogenated nitrile rubber (HNBR), nitrile rubber (NBR), fluororubber (FKM), urethane rubber (U), or the like is used as the material for dust seal ring 100A.

Dust seal ring 100A includes an annular body seal 110, which is partially split in a circumferential direction, and a body seal abutment surface 110*c*, which is provided on the split surface of body seal 110 so as to be joined. Body seal abutment surface 110*c* is provided in the form of a plurality of steps, and a joint line C1 is exposed on the first side surface 111*c* side, which is one side, in a direction of extension of a central axis CL. Similarly, a joint line C2 is exposed on the second side surface 111*d* side, which is the other side, in the direction of extension of center axis CL. The form of body seal abutment surface 110*c* is not limited to a staircase shape, and various known forms can be applied.

Figure 3:
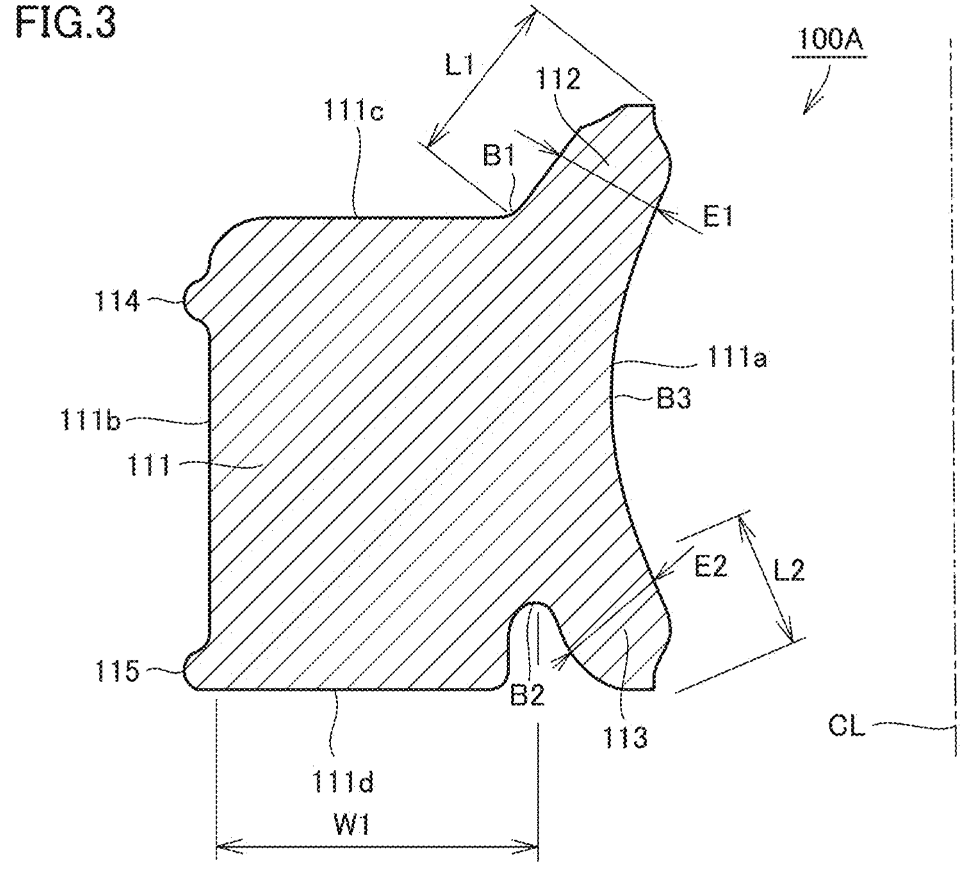
FIG. 3 is an enlarged sectional view of the dust seal ring of Embodiment 1.

Referring to FIG. 3, the sectional shape of dust seal ring 100A will be described. FIG. 3 is an enlarged sectional view of dust seal ring 100A, and this cross section has the shape as viewed along a virtual plane including central axis CL of body seal 110. Body seal 110 includes body portion 111 of an approximately rectangular shape. Body portion 111 includes an inner surface 111*a* located radially inward of body portion 111, an outer surface 111*b* located radially outward of body portion 111, a first side surface 111*c* on one side in the direction of extension of central axis CL of body portion 111, and a second side surface 111*d* on the other side in the direction of extension of central axis CL of body portion 111.

Body seal 110 includes a first lip 112 and a second lip 113 on the inner surface 111*a* side. First lip 112 is shaped to extend, on one side in the direction of extension of central axis CL, contiguous to first side surface 111*c* while inclining inwardly away from body portion 111. Second lip 113 is shaped to extend, on the other side in the direction of extension of central axis CL, contiguous to second side surface 111*d* while inclining inwardly away from body portion 111. A thickness (E1) of first lip 112 is about 1 mm. A thickness (E2) of second lip 113 is about 1 mm.

First side surface 111*c* and the outer surface of first lip 112 are provided to be contiguous to each other with a curved surface B1 in between. Second side surface 111*d* and the outer surface of second lip 113 are provided to be contiguous to each other with a recessed surface B2, which is recessed toward body portion 111, in between.

Further, a length L1 of first lip 112 and a length L2 of second lip 113 are provided to be smaller than a width W1 in the radial direction of body portion 111. Length L1 of first lip 112 means the length from the root of first lip 112 intersecting first side surface 111*c* to the tip of first lip 112 in the cross section of FIG. 3. Length L2 of second lip 113 means the length from the bottom of recessed surface B2 to the tip of second lip 113. Width W1 in the radial direction of body portion 111 means the length from outer surface 111*b* to the bottom of recessed surface B2.

In the present embodiment, further, outer surface 111*b* is provided with a first protrusion 114 and a second protrusion 115 protruding outwardly. First protrusion 114 is provided on the first side surface 111*c* side, and second protrusion 115 is provided on the second side surface 111*d* side. The form in which first protrusion 114 and second protrusion 115 are not provided can also be adopted.

(Mounted State of Dust Seal Ring 100A)

Figure 4:
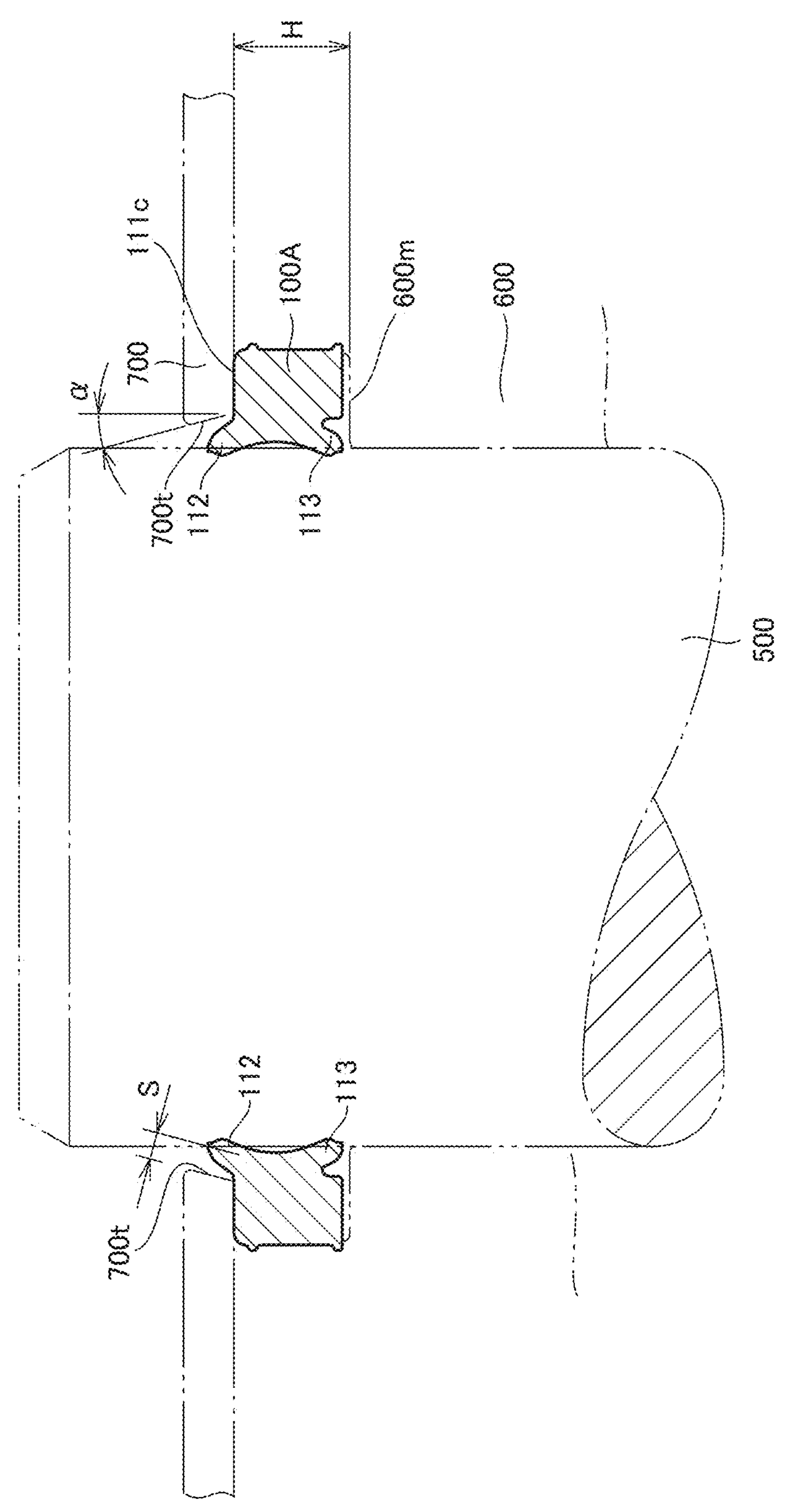
FIG. 4 is a sectional view of the dust seal ring of Embodiment 1 in its mounted state.

Referring to FIG. 4, the mounted state of dust seal ring 100A having the above configuration will be described. FIG. 4 is a sectional view of dust seal ring 100A in its mounted state. This cross section has the shape as viewed along the virtual plane including central axis CL of body seal 110.

The state in which dust seal ring 100A is mounted on the outer surface of a rod 500 is shown. Dust seal ring 100A is fitted into a mounting groove 600*m* provided in a body 600, and body portion 111 of dust seal ring 100A is fixed while being compressed by a split plate 700 from the first side surface 111*c* side. A clamping device (not shown) is used for compression. A gap(S) between the center of first lip 112 and an end face 700*t* of split plate 700 is preferably about 1 mm. An inclination angle (a) of end face 700*t* of split plate 700 is preferably about 15 degrees.

The outer diameter dimension of dust seal ring 100A may be set to be greater than the dimension of the mounting portion of mounting groove 600*m* (by about 0.5% to 2%), such that dust seal ring 100A is compressed from the outer dimeter side in the radial direction after being mounted into mounting groove 600*m*.

Mounting groove 600*m* preferably has a split type configuration, and body portion 111 may be compressed by split plate 700. The dimensions of body portion 111 may have a squeeze of 2% to 6% relative to mounting groove 600*m*.

(Comparative Technique: Dust Seal Ring 200)

Figure 5:
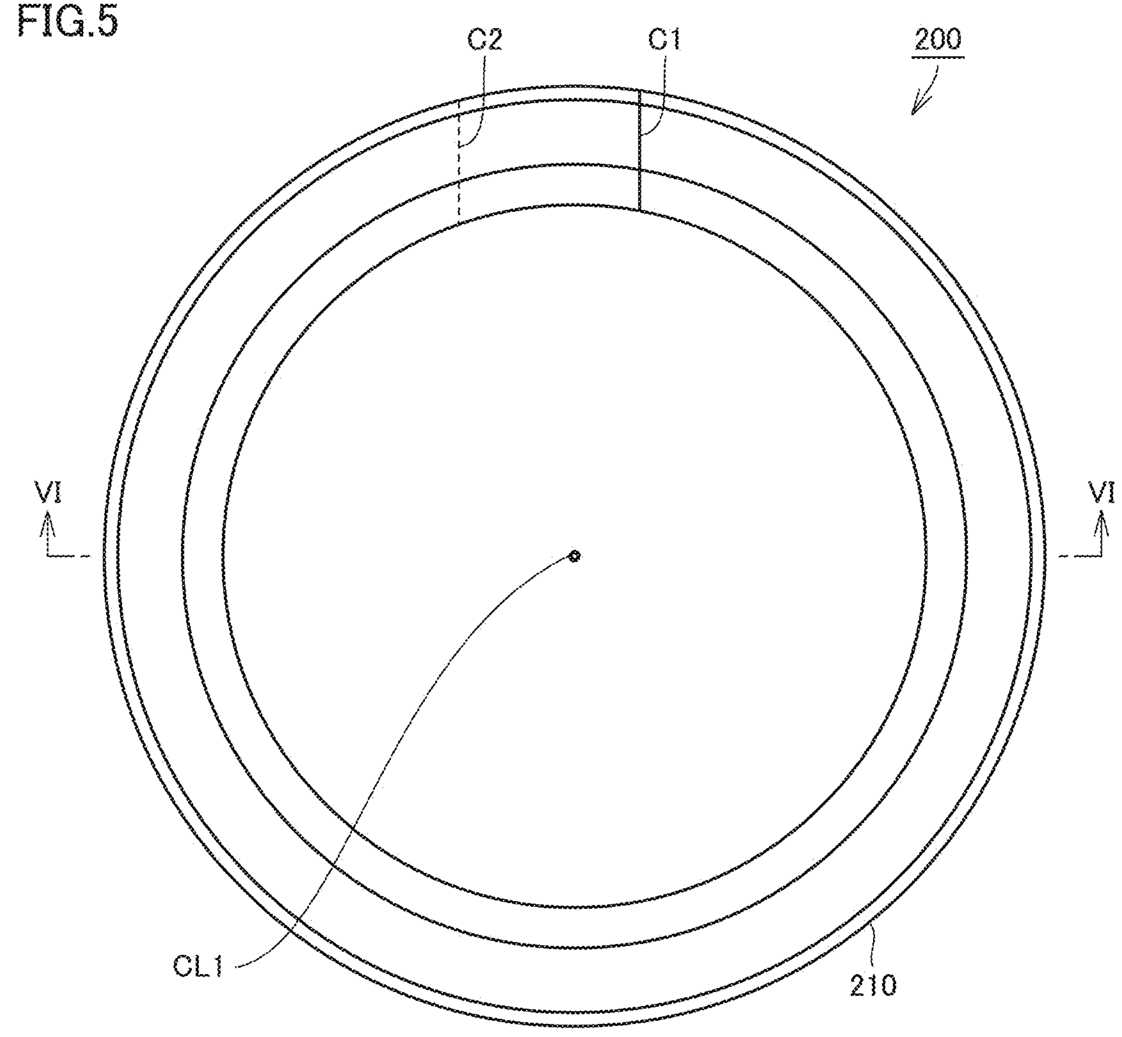
FIG. 5 is a plan view of a dust seal ring of a comparative technique.
Figure 6:
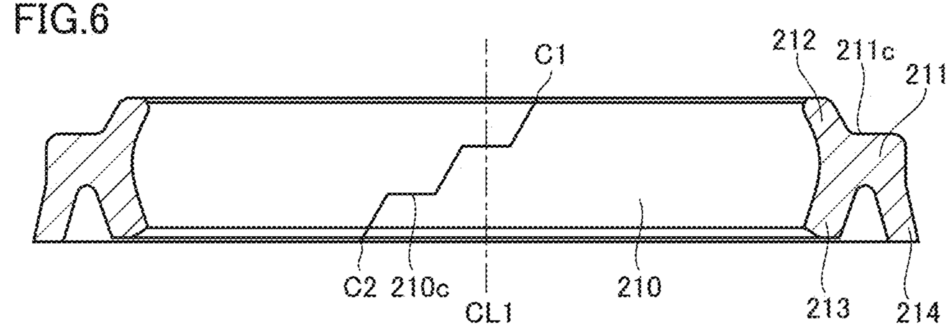
FIG. 6 is a sectional view taken along the arrow line VI-VI in FIG. 5.
Figure 7:
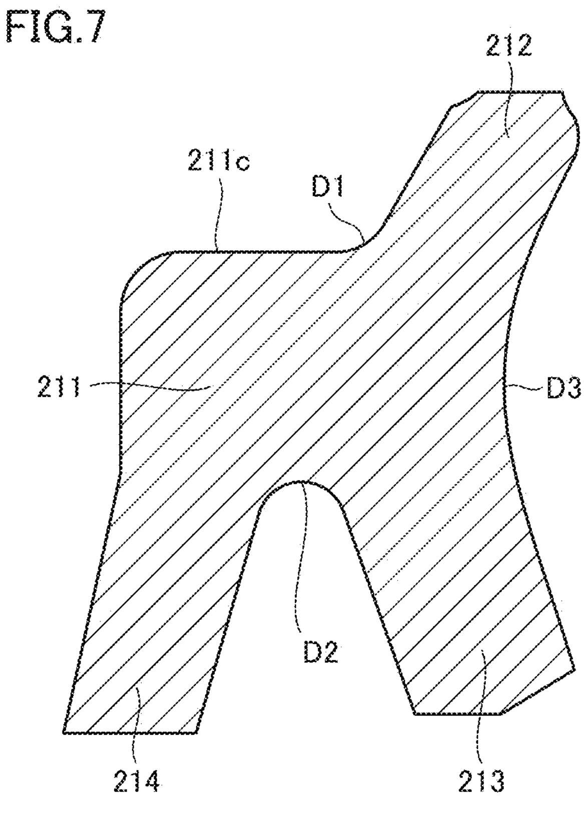
FIG. 7 is an enlarged sectional view of the dust seal ring of the comparative technique.

The shape of a dust seal ring 200 as a comparative technique will now be described with reference to FIGS. 5 to 7. FIG. 5 is a plan view of dust seal ring 200 of the comparative technique. FIG. 6 is a view taken along the arrow line VI-VI line in FIG. 5, and FIG. 7 is an enlarged sectional view of the dust seal ring of the comparative technique. The basic configuration of dust seal ring 200 in the comparative technique is the same as that of dust seal ring 100A described above. The difference is in sectional shape. The same or corresponding parts have the same reference characters allotted, and redundant description will not be repeated.

Dust seal ring 200 has an annular form in plan view. For example, hydrogenated nitrile rubber (HNBR), nitrile rubber (NBR), fluororubber (FKM), urethane rubber (U), or the like is used as the material for dust seal ring 200.

Dust seal ring 200 has an annular body seal 210, which is partially split in the circumferential direction, and a body seal abutment surface 210*c*, which is provided to be joined on the split surface of body seal 210. Body seal abutment surface 210*c* is provided in the form of a plurality of steps, and joint line C1 is exposed on one side in the direction of extension of central axis CL. Similarly, joint line C2 is exposed on the other side in the direction of extension of central axis CL.

Referring to FIG. 7, the sectional shape of dust seal ring 200 will be described. FIG. 7 is an enlarged sectional view of dust seal ring 200, and this cross section shows the shape of body seal 210 as viewed along a virtual plane including central axis CL.

Body portion 211 is radially provided with a first lip 212, a second lip 213, and a third lip 214. First lip 212 is shaped to extend, on one side in the direction of extension of central axis C, while inclining radially inwardly away from body portion 211. Second lip 213 is shaped to extend, on the other side in the direction of extension of central axis CL, while inclining radially inwardly away from body portion 211.

Third lip 214 is shaped to extend, on the other side in the direction of extension of central axis CL, while inclining radially outwardly away from body portion 211.

The outer surfaces of first lip 112 and body portion 211 are provided to be contiguous to each other with a curved surface D1 in between. Second lip 213 and third lip 214 are provided to be contiguous to each other with a recessed surface D2, which is recessed toward body portion 211, in between. The outer surfaces of first lip 212 and second lip 213 are provided to be contiguous to each other with a curved surface D3 in between.

Figure 8:
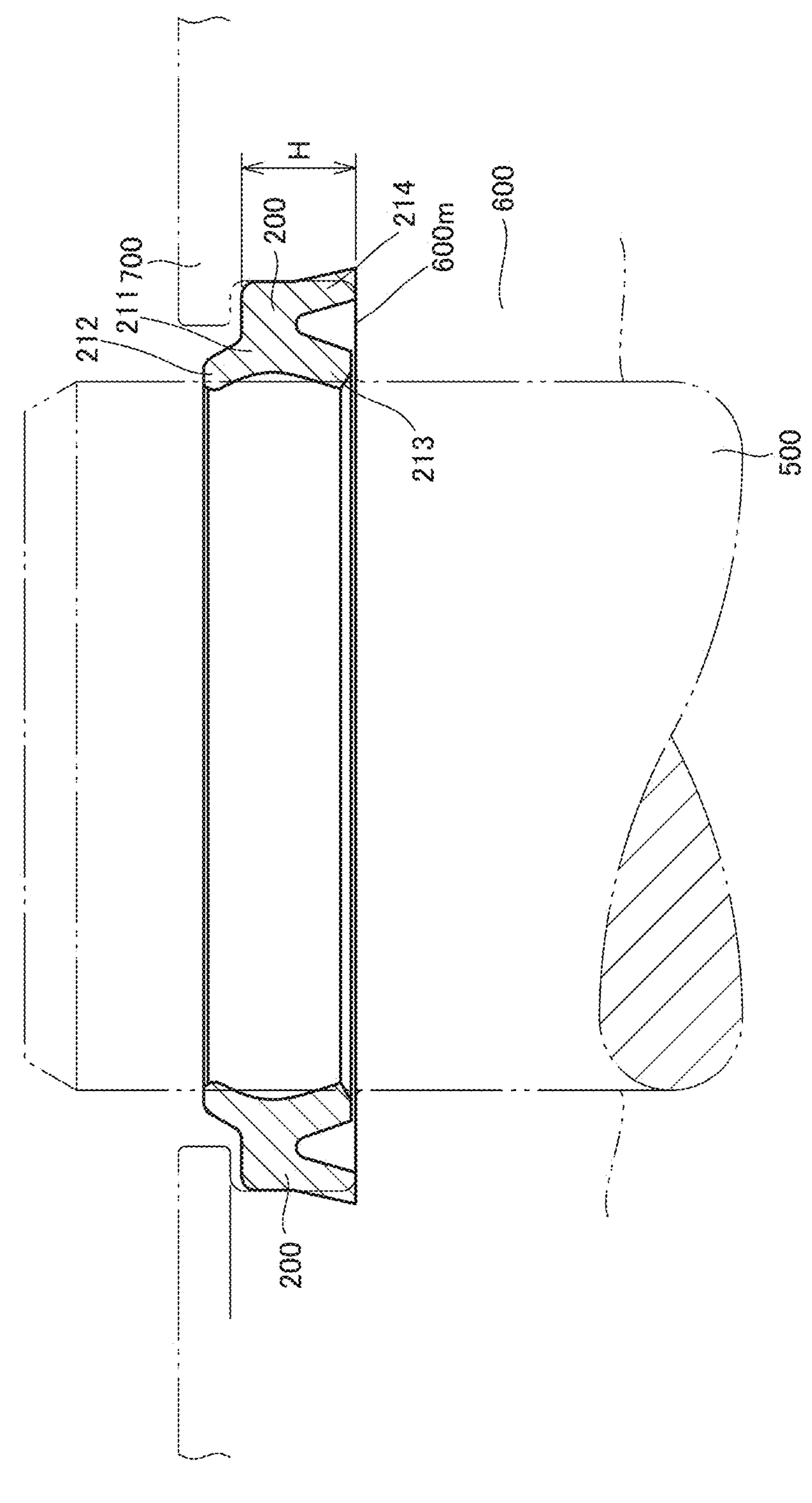
FIG. 8 is a sectional view of the dust seal ring of the comparative technique in its mounted state.

Referring to FIG. 8, the mounted state of dust seal ring 200 having the above configuration will be described. FIG. 8 is a sectional view of dust seal ring 200 in its mounted state. This cross section shows the shape as viewed along the virtual plane including central axis CL of body seal 210.

The state in which dust seal ring 200 is mounted on the outer surface of rod 500 is shown. Dust seal ring 200 is fitted into mounting groove 600*m* provided in body 600, and body portion 211 of dust seal ring 200 is fixed by split plate 700 from the upper surface side of body portion 211.

(Comparison and Examination)

The sealing functions of dust seal ring 100A in its mounted state, shown in FIG. 4, and dust seal ring 200 in its mounted state, shown in FIG. 8, will be compared and examined. In the case of dust seal ring 200 shown in FIG. 8, body seal abutment surface 210*c* is located on first lip 212, second lip 213, and third lip 214. Thus, when a pressure is applied to dust seal ring 200, first lip 212 and second lip 213 easily collapse because the length of each of first lip 212 and second lip 213 is provided to be large for the overall configuration of dust seal ring 200. As a result, oil leakage easily occurs on body seal abutment surface 210*c*.

Contrastingly, in the case of dust seal ring 100A in Embodiment 1 described above, body seal abutment surface 110*c* is located as in dust seal ring 200. However, first lip 112 of dust seal ring 100A extends, on inner surface 111*a* in the radial direction of body portion 111, while inclining inwardly away from body portion 111 on one side in the direction of extension of central axis CL.

Dust seal ring 100A includes second lip 113 extending, on inner surface 111*a* in the radial direction of body portion 111, while inclining inwardly away from body portion 111 on the other side in the direction of extension of central axis CL. As a result, even when a pressure is applied to dust seal ring 100, first lip 112 and second lip 113 collapse less easily. As a result, the occurrence of oil leakage on body seal abutment surface 110*c* can be suppressed.

More preferably, each of first lip 112 and second lip 113 can be provided to have a length smaller than width W1 in the radial direction of body portion 111, further suppressing collapse of first lip 112 and second lip 113 even when a pressure is applied to dust seal ring 100.

Further, body portion 111, which is provided with first protrusion 114 and second protrusion 115 on outer surface 111*b*, allows first protrusion 114 and second protrusion 115 to press the flat surface of mounting groove 600*m*, further suppressing the occurrence of oil leakage.

Embodiment 2: Dust Seal Ring 100B

Figure 9:
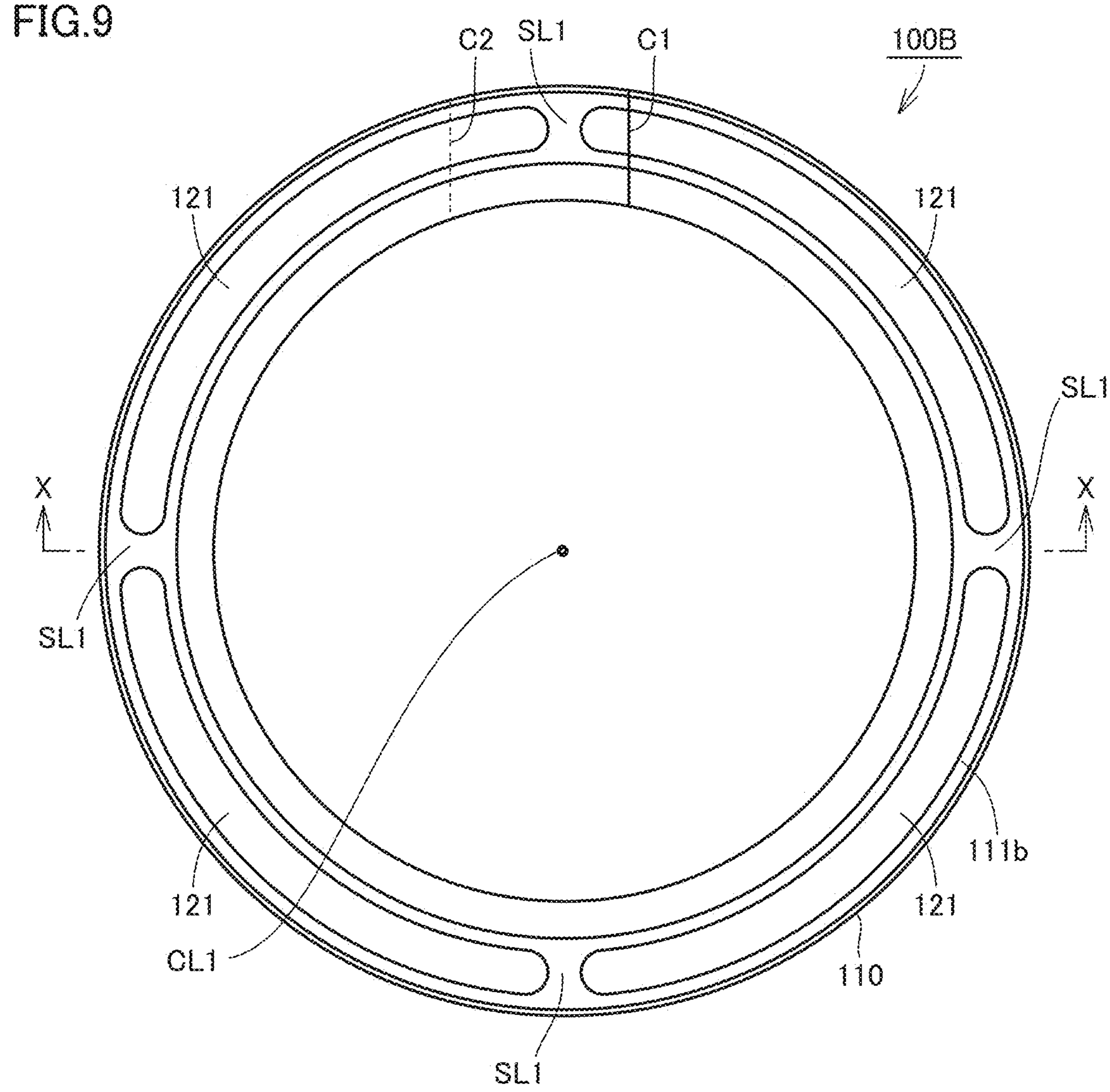
FIG. 9 is a plan view of a dust seal ring of Embodiment 2.
Figure 10:
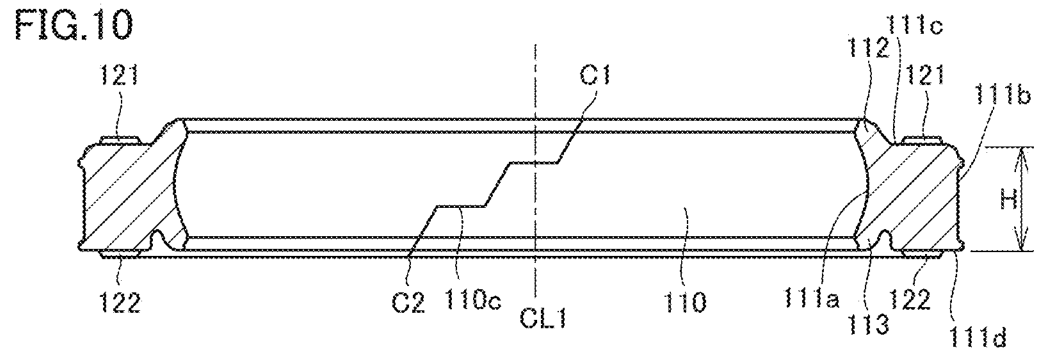
FIG. 10 is a sectional view taken along the arrow line X-X in FIG. 9.
Figure 11:
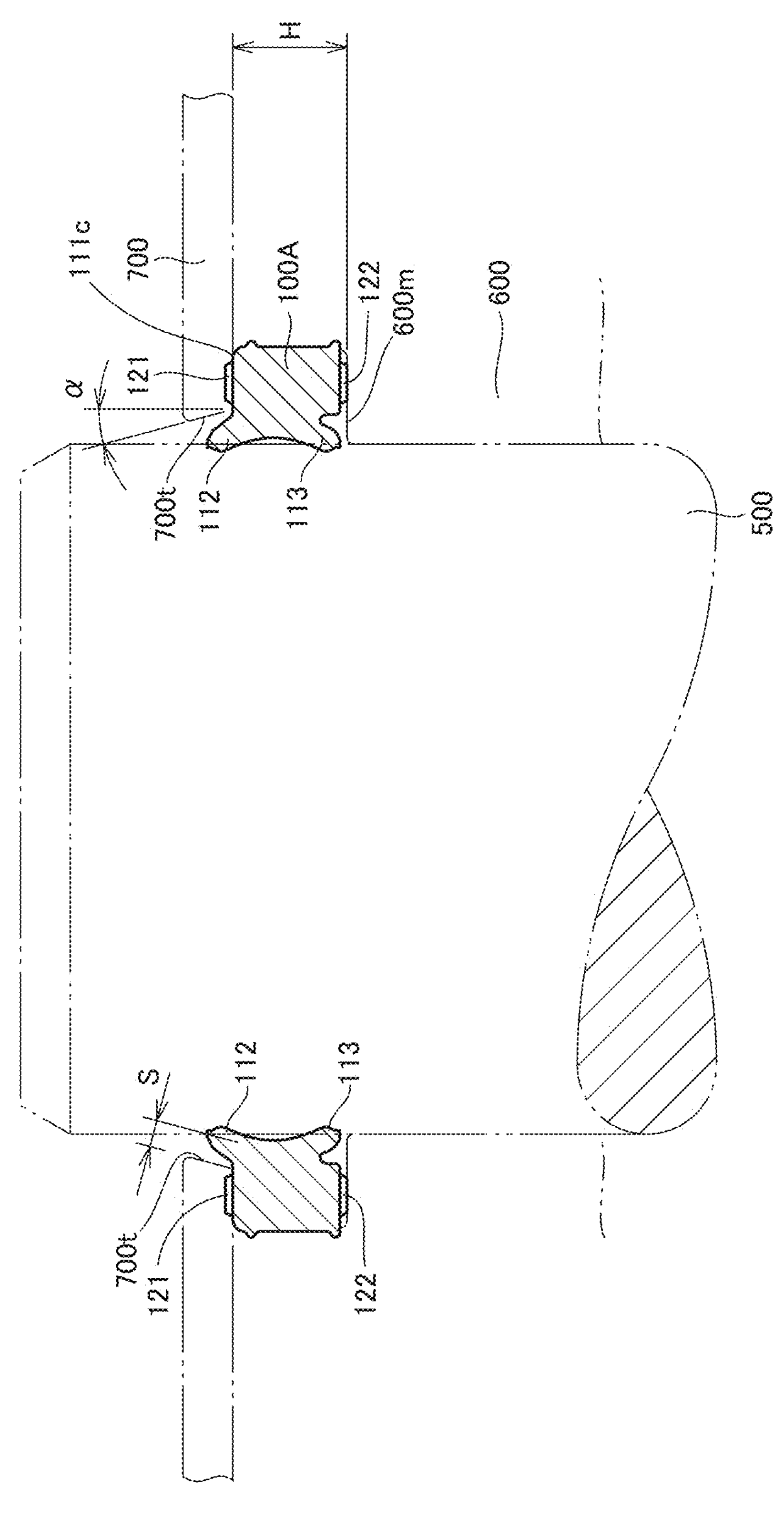
FIG. 11 is a sectional view of the dust seal ring of Embodiment 2 in its mounted state.

Referring to FIGS. 9 to 11, a dust seal ring 100B of the present embodiment will be described. FIG. 9 is a plan view of dust seal ring 100B, FIG. 10 is a view taken along the arrow line X-X in FIG. 9, and FIG. 11 is a sectional view of dust seal ring 100B in its mounted state.

The basic configuration of dust seal ring 100B of the present embodiment is the same as that of dust seal ring 100A of Embodiment 1. The same or corresponding parts have the same reference characters allotted, and redundant description will not be repeated.

The difference from dust seal ring 100A of Embodiment 1 is that a first retaining plate 121, which is split into four parts, is provided on first side surface 111*c* of body portion 111, as well shown in the plan view of FIG. 9. A slit SL1, on which first retaining plate 121 is not placed, is provided between adjacent first retaining plates 121. Slit SL1 serves as an air escape route when dust seal ring 100B is mounted into mounting groove 600*m*. For the same purpose, a second retaining plate 122, which is split into four parts, is also provided on second side surface 111*d* of body portion 111.

Dust seal ring 100B in the present embodiment also has the same functions and effects as those of Embodiment 1. Further, by providing first retaining plate 121, body portion 111 can be compressed more to further suppress the occurrence of oil leakage in mounting of dust seal ring 100B into mounting groove 600*m*.

Although the case in which first retaining plate 121 and second retaining plate 122 are split into four parts has been described, the plates may be split into two or more parts according to the sealing performance required for the dust seal ring, without being limited to four parts.

It should be understood that the embodiments disclosed herein have been presented for the purpose of illustration and non-restrictive in every respect. It is intended that the scope of the present invention is defined by claims, rather than by the above description, and encompasses all modifications and variations equivalent in meaning and scope to the claims.

REFERENCE SIGNS LIST

100, 100A, 100B, 200 dust seal ring; 110, 210 body seal; 110*c*, 210*c* body seal abutment surface; 111, 211 body portion; 111*a* inner surface; 111*b* outer surface; 111*c* first side surface; 111*d* second side surface; 112, 212 first lip; 113, 213 second lip; 114 first protrusion; 115 second protrusion; 121 first retaining plate; 122 second retaining plate; 214 third lip; 500 rod; 600 body; 600*m* mounting groove; 700 split plate; 700*t* end face.

The invention claimed is:

1. A dust seal ring comprising:

a body seal of an annular shape split partially in a circumferential direction; and a body seal abutment surface provided to be joined on a split surface of the body seal, wherein in a cross section of the body seal as viewed along a virtual plane including a central axis of the body seal, the body seal includes a body portion of an approximately rectangular shape, a first lip extending, on an inner surface in a radial direction of the body portion, while inclining inwardly away from the body portion on one side in a direction of extension of the central axis, and a second lip extending, on the inner surface in the radial direction of the body portion, while inclining inwardly away from the body portion on the other side in the direction of extension of the central axis;

wherein the body portion includes a first retaining plate disposed, on a first side surface of the body portion of the approximately rectangular shape on the one side in the direction of extension of the central axis, along the annular shape of the body seal, and a second retaining plate disposed, on a second side surface of the body portion of the approximately rectangular shape on the other side in the direction of extension of the central axis, along the annular shape of the body seal.

2. The dust seal ring according to claim 1, wherein in the cross section of the body seal as viewed along the virtual plane including the central axis of the body seal, the body portion includes a first protrusion protruding, on an outer surface in the radial direction of the body portion, outwardly on the one side in the direction of extension of the central axis, and a second protrusion protruding, on the outer surface in the radial direction of the body portion, outwardly on the other side in the direction of extension of the central axis.

3. The dust seal ring according to claim 1, wherein a length of the first lip and a length of the second lip are provided to be smaller than a width in the radial direction of the body portion.

4. The dust seal ring according to claim 1, wherein the body portion of the cross section of the body seal is unitary and contiguous along the circumferential direction of the body seal except at the split.

5. The dust seal ring according to claim 4, wherein the body portion of the cross section of the body seal is formed as unitary and contiguous material chosen from hydrogenated nitrile rubber (HNBR), nitrile rubber (NBR), fluororubber (FKM), and urethane rubber (U).

6. The dust seal ring according to claim 1, wherein the inner surface in a radial direction of the body portion is disposed directly adjacent an outer surface of a rod.

* * * * *